United States Patent [19]

Cheney et al.

[11] Patent Number: 4,466,945
[45] Date of Patent: Aug. 21, 1984

[54] METHOD OF RECOVERING METAL CARBIDES

[75] Inventors: Richard F. Cheney; Anil Bansal, both of Sayre, Pa.

[73] Assignee: GTE Products Corporation, Stamford, Conn.

[21] Appl. No.: 506,178

[22] Filed: Aug. 8, 1983

Related U.S. Application Data

[62] Division of Ser. No. 434,987, Oct. 18, 1982.

[51] Int. Cl.³ .............................................. C01B 31/30
[52] U.S. Cl. ..................................... 423/53; 423/440; 75/63; 75/123 J; 75/236; 75/0.5 BB; 156/656
[58] Field of Search ................. 75/63, 203, 114, 123 J, 75/134 F, 174, 176, 236, 239, 240, 121, .5 B, 0.5 A, 0.5 BB; 419/16, 17, 18; 241/23; 423/53, 440; 56/656

[56] References Cited

U.S. PATENT DOCUMENTS 3,595,484 7/1971 Barnard et al. ........................ 75/63

Primary Examiner—John Doll
Assistant Examiner—Robert Stoll
Attorney, Agent, or Firm—Robert E. Walter

[57] ABSTRACT

Metal carbide is reclaimed from scrap by sorting the scrap to separate pieces of cemented carbide having similar composition and grain size and treating the separated portion to form metal carbide grains which may be resintered with metal binder to obtain cemented carbides having grain characteristics similar to the starting material.

1 Claim, 3 Drawing Figures

METHOD OF RECOVERING METAL CARBIDES

This is a division of application Ser. No. 434,987, filed Oct. 18, 1982.

This invention relates to a process for recovering metal carbide from scrap material containing cemented metal carbides.

Cemented metal carbides are typically used in mining, drilling and cutting tool bits, dies, wear plates and generally comprise particles of metal carbides bonded together in a matrix of cementing agent. The above mentioned carbides are generally available in the form of scraps which may contain additional materials in the form of machine turnings, metal clippings, and thus may contain a variety of both ferrous and nonferrous materials.

In one type of prior art process for separating or reclaiming the particular constituents of scrap material, the hard tungsten carbides are oxidized. One such method is disclosed in U.S. Pat. No. 2,704,240. The oxidized carbides may be then reprocessed to obtain the final purified product. According to U.S. Pat. No. 3,887,680 to MacInnis, Vanderpool and Boyer the oxidized tungsten carbide is digested in an aqueous solution of alkali metal hydroxide under controlled conditions to recover tungsten values. According to these type of processes, the constituents of scrap materials are returned to their soluble elemental values in an aqueous solution and the soluble metal values are separated by various methods to give relatively pure products which can be carburized. Thus, these processes can be used to form metal carbides indirectly.

According to one process known in the prior art, cemented metal carbides are immersed in solution to leach out the matrix or binder material so as to leave a residue of metal carbide. In another process a mixture of metal carbide and metal binder is formed by breaking the bond between the metal binder and the metal carbide. In both cases the resulting mixture may be ground to a powder for direct reuse in the preparation of cemented carbides. These processes are obviously advantageous where the desired final product is a metal carbide. Since a useable metal carbide directly results from a simple one or two step process, the process is economical in terms of energy and material.

Typical processes of this type are disclosed in U.S. Pat. No. 3,438,730 to Shwayder where metal carbide cemented by cobalt is immersed in a weak phosphoric acid to cause the cobalt to dissolve and free the metal carbide particles.

U.S. Pat. No. 3,635,674 to Shwayder involves using ammonia or an amine in a sealed container containing elemental oxygen under pressure to cause the binder to react with the amine and free the refractory carbide in its original particulate form.

U.S. Pat. No. 2,848,313 to Kakahashi et al discloses a method wherein the hard scrap is immersed in a fluid material which forms a deliquescent product with the binder material. Hydration of the deliquescent product causes internal stresses in the cemented metal carbide to cause disintegration.

U.S. Pat. No. 3,595,484 to Barnard et al relates to a process where molten zinc forms an alloy with cementing agent, usually cobalt, thereby dissolving the carbide cementing agent bond and permitting recovery of a mixture of the carbide and cementing agent in a form that can be reused in preparation of cemented carbides.

In manufacturing a cemented carbide cutting tip from reclaimed metal carbide powder, the powder and metal binder such as cobalt are mixed to form a grade powder. A wax binder may be included to promote the flowability of the grade powder into die cavities, to aid in pressing by a lubricating action, and to impart sufficient green strength to permit handling after pressing. Grade powders are pressed and sintered to form cemented carbide articles such as drill tools, cutting bits and wear parts.

According to the above mentioned reclaim processes, the reclaimed metal carbide after treatment is suitable for reuse in preparing cemented carbides by sintering. However, a serious disadvantage is that the grain size of metal carbide of the cemented carbides prepared from reclaimed powder is variable and non-uniform.

The grain size of the metal carbide in the matrix metal binder of a cemented metal carbide affects the properties of the cemented carbide. For example, fine grained material has a greater resistance to wear and greater hardness than coarse grained material which in turn has a greater toughness than the fine grained material.

There are many instances in which reclaimed metal carbide cannot be used, especially, when it is desirable to produce a highly uniform and consistent product. As more and more metal carbide is produced by reclaim methods, the resulting carbide powder or grain becomes more and more degraded with attendant control over grain size more difficult. Thus, to obtain high quality product, previously described methods are used which return scrap to soluble metal values with attendant disadvantages of high energy.

Heretofore, prior art processes for directly producing particulate metal carbide from scrap material containing cemented carbides have not been satisfactory for producing quality products with controlled grain size.

SUMMARY OF THE INVENTION

Figure 1:
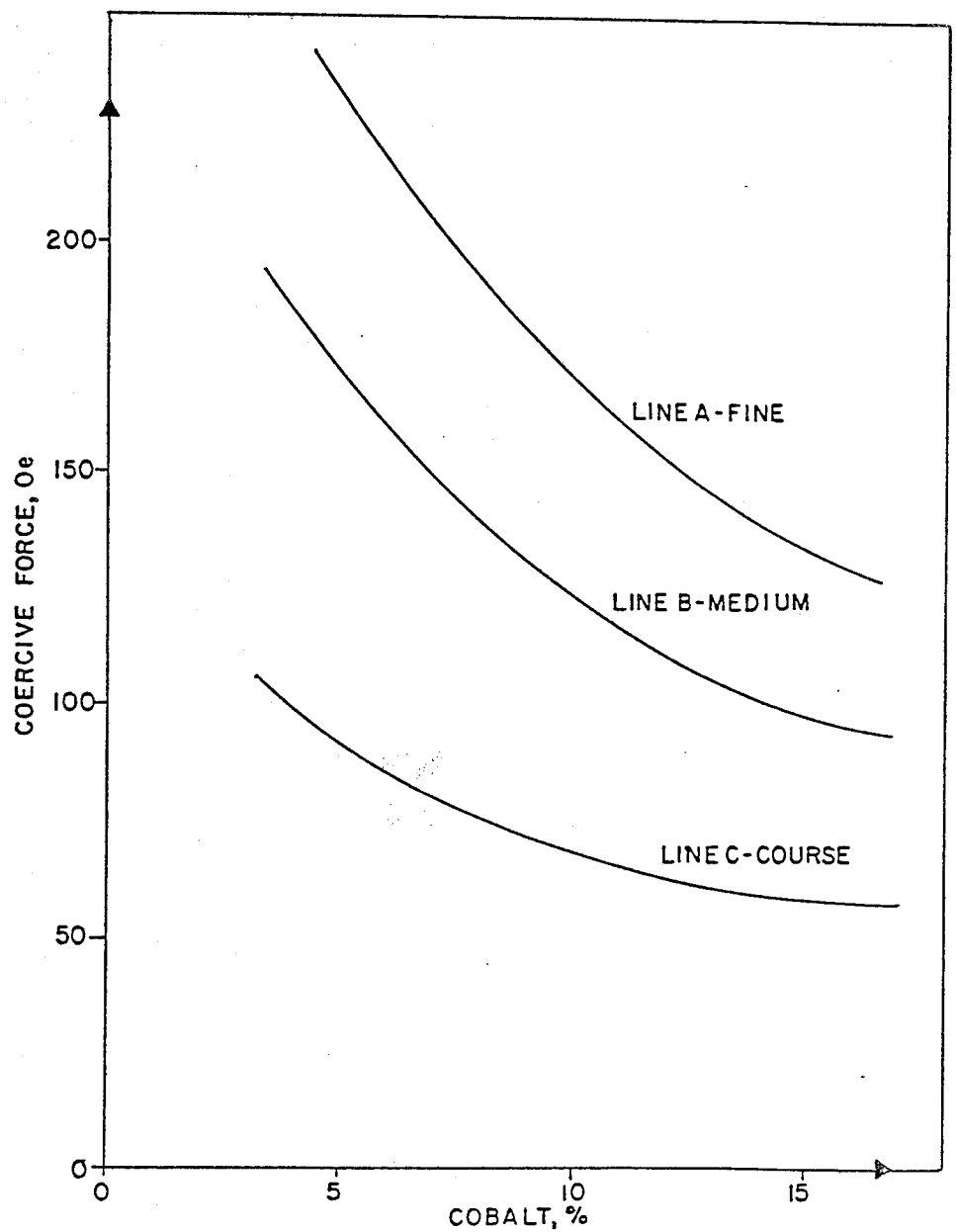
FIG. 1 is a plot of coercive force vs. percent metal binder for three representative grain sizes.

The present invention provides for the separation or sorting of cemented metal carbide scrap according to the grain size of the metal carbide in the cemented carbide scrap. The sorted scrap is treated to directly produce metal carbide powder. By sorting the scrap prior to reclaiming, greater control can be achieved over grain size in the products made from reclaimed metal carbide powder.

According to the present invention, the grain size of cemented metal carbide scrap is determined as a function of coercive force for a known metal binder composition and at least a portion of the pieces having a desired grain size are separated.

Also, in accordance with another aspect of the present invention, there is provided a process for reclaiming metal carbide from pieces of cemented metal carbide comprising separating at least a portion of the scrap pieces having a predetermined grain size and treating said portion with hydrochloric acid or molten zinc. The reclaimed metal carbide may be reprocessed to form sintered metal carbide products having metal carbide grain size corresponding to the grain size of the sorted scrap.

DESCRIPTION

The scrap material being processed may contain in addition to metal carbides, various types of other metal values such as chromium, nickel, iron. Typical cemented metal carbides comprise one or more transitional carbides of a metal of Groups IVB, VB and VIB of the Periodic Table cemented or bonded by one or more matrix metals selected from the group consisting of iron, nickel and cobalt. Typical cemented carbides may contain tungsten carbide in a cobalt matrix, titanium carbide in a cobalt matrix or titanium carbide in a nickel matrix. Most scrap carbides comprise a mixture of the metal carbides. The primary constituent of most cemented metal carbide scraps is tungsten carbide in a cobalt metal or cobalt metal alloy matrix or binder. The grain size of the metal carbide varies depending on the use. For instance, circuit board drills typically comprise fine grained tungsten carbide with a cobalt content of about 6 percent while coarse grain material typically is used in mine drills with a cobalt content of about 10 percent.

The scrap is preferably initially be sorted by the composition of the metal binder so that subsequent separation gives reclaim powder having a predetermined grain size. Scrap having a substantially similar binder composition may be separated by coercive force measurement and metal binder content as hereinafter described to give lots of desired predetermined grain size. Preferably the initial separation is also by composition of the metal carbide so that the resulting reclaim powder not only has a predetermined grain size but also a predetermined metal carbide composition. If the initially sorted cemented carbide has different metal binder compositions and the initial sorting is performed by determining grain size as a function of measured coercive force and metal binder content, only pieces of cemented carbide that have compositionally similar metal binder will have similar grain size of metal carbide.

Scrap may have a similar composition only in terms of metal binder content or only in terms of metal carbide content. If both the metal carbide and metal binder are compositionally similar, the entire cemented metal carbide is considered similar. Similarity in terms of composition as set forth herein is intended to refer to similarity in terms of quality and not quantity. Similar compositions are preferably substantially identical in identified materials but may have different quantities of those identified materials.

For example, a cemented metal carbide having a 20 percent by weight cobalt metal binder content and 80 percent by weight tungsten carbide content has a metal binder composition similar to a cemented carbide having a 12 percent by weight cobalt metal binder content. If the latter cemented carbide has a metal carbide content of 80 percent tungsten carbide and 8 percent tantalum carbide, the metal carbide composition may be considered to be different. The degree of metal binder and metal carbide similarity required may vary depending on the desired use of the reclaim powder. Certain applications, such as printer wire may require a substantial identity as to the composition of metal carbide, while other applications such as for wear parts may permit the use of variable compositions of metal carbide. The amount or content of metal binder in the cemented carbide as quantitative value is hereinafter expressed in weight percent of metal binder based on the total weight of the cemented carbide. It is contemplated that other expressions of quantity such as volume percent may also be used.

The composition in terms of identifiable materials and the quantity of those materials may be determined by X-ray fluorescence or emission spectrometry. According to these techniques, elements contained in the samples are excited by X-rays or high intensity spark. For the X-ray fluorescence technique (XRF), the characteristic X-rays given off are analyzed. The spectrum of X-rays and their energy levels are analyzed to provide a quantitative analysis of the samples composition. For the emission spectrometry, the resulting light is dispersed by a diffraction grating. The spectrum line intensities at specific wave lengths are proportional to the concentration of the individual elements in the sample.

Cemented metal carbide scrap of substantially similar metal binder composition is separated according to metal carbide grain size according to the following technique as described in copending application Ser. No. 06/434,437. Preferably the scrap has also been separated so as to have substantially similar metal carbide composition. The coercive force of the sorted scrap is determined by placing a sample into a magnetizing and measuring coil magnetized to saturation to provide a magnetic field which is detected by field sensors. Then an increasing opposing field is created until the field produced by the sample reaches zero. At this instant, the induction is zero and the field in the coil is the coercive force (Hc) of the sample.

From the above knowledge of metal binder composition, content of binder, i.e. weight percent, and coercive force determination, the grain size of the metal carbide in the cemented metal carbide scrap can be determined. By characterizing common types of cemented metal carbide scrap according to entire composition and binder content, scrap of similar entire composition may be characterized according to grain size by a coercive force measurement. The specification and claims of copending application Ser. No. 06/434,437, filed Oct. 14, 1982, and entitled METHOD OF DETERMINING THE SIZE OF METAL CARBIDE GRAINS IN CEMENTED METAL CARBIDES, are incorporated by reference into the present application.

According to the specification, the starting powders used in the cemented carbide compositions are generally in pure form. It is desirable to exclude impurities such as oxygen which tends to have deleterious effects on the density of the composition. On the other hand, minor amounts of many impurities may be present such as small amounts of other metals such as titanium, zirconium, tantalum, or niobium. To have a metal carbide suitable for the non-destructive method of determining grain size in accordance with the method of the present invention, it is preferable that the unknown additives or impurities be less than about 2% by weight.

The contents and quantity of various elements in the cemented metal carbide are measured. This may be performed by any method known in the art, but is preferably performed by a non-destructive method that can be performed rapidly such as X-ray fluorescence (XRF) or emission spectrometry. According to these techniques, elements contained in the samples are excited by X-rays or high-intensity spark. For the XRF technique, the characteristic X-rays given off are analyzed. The spectrum of X-rays and their energy levels are analyzed to provide a quantitative analysis of the sample composition. For the emission spectrometry, the resultant light is dispersed by a diffraction grating. The spectrum line intensities at specific wavelengths are proportional to the concentration of the individual elements in the sample.

The coercive force of the sample is next determined. Typically the coercive force may be determined by placing a sample into a magnetizing and measuring coil magnetized to saturation to provide a magnetic field which is directed by field sensors. Then an increasing opposing field is created until the field produced by the sample reaches zero. At this instant, the induction is zero and the field in the coil is the coercive force (Hc) of the sample.

Figure 2:
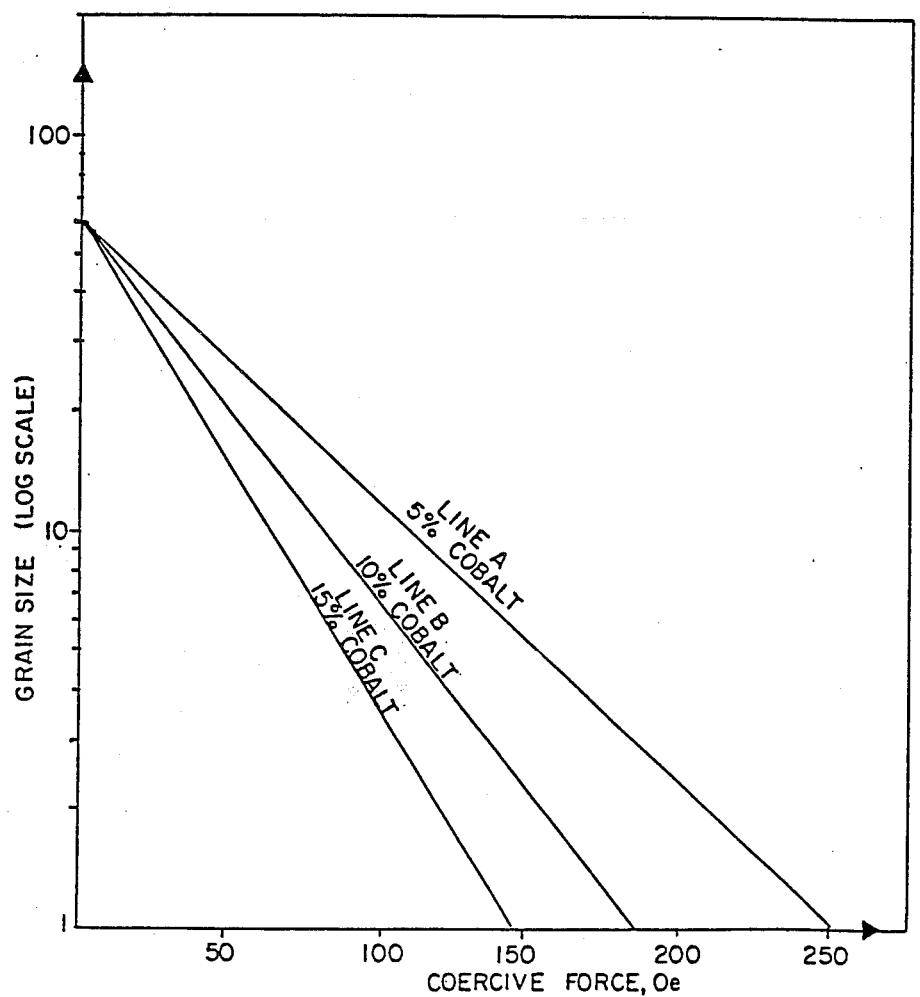
FIG. 2 is a plot of grain size vs. coercive force.

According to the principles of the present invention, a determination of metal carbide grain size is based on coercive force being a function of grain size for a determined composition of metal carbide grains and binder metal. FIG. 1 is a graph plotting coercive force against the percent metal binder for three grain sizes. The grain size represented as line A is fine, line B is medium, and line C is coarse. In FIG. 2, the log of grain size is plotted against coercive force to obtain a series of three lines with a common intercept. On the Cartesian graph, the log of grain size (log G) is the ordinate and coercive force (Hc) is the abscissa. Line A represents a constant low weight percent metal binder content, line B a medium binder content and line C a high metal binder content. The graph has the following mathematical formula:

$$\log G = -m \times Hc + I_1 \quad (1)$$

m = Positive slope
Hc = Coercive force in oersteds
$I_1$ = Intercept on Y-axis
G = Grain size in microns (um)

Figure 3:
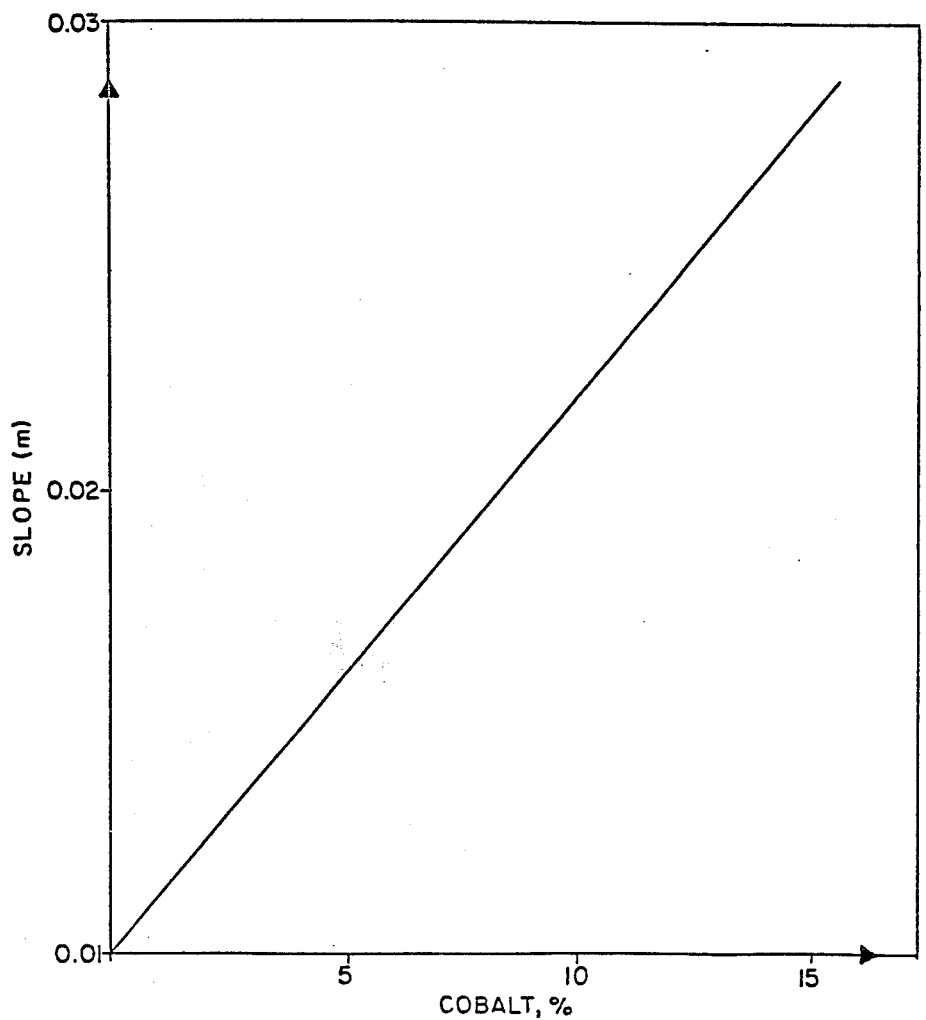
FIG. 3 is a plotting of numerical value of slopes from FIG. 2 vs. metal binder content.

Since the slope m of the above equation appears to be a function of metal binder content, the slope m was plotted against the metal binder content in FIG. 3. A single straight line was obtained having the formula $$m = MB + I_2 \quad (2)$$

m = slope from FIG. 2
M = slope of FIG. 3
B = percent binder in cemented metal carbide
$I_2$ = Intercept on Y-axis By substituting for m in Equation 1 the following equation is obtained.

$$\log G = -(MB + I_2)Hc + I_1 \quad (3)$$

Cemented carbides may have a similar composition only in terms of metal binder content or only in terms of metal carbide content. If both carbide and binder are compositionally similar, the entire cemented carbide is considered compositionally similar. Similarity in terms of composition as set forth herein is intended to refer to similarity in terms of quality and not quantity. Similar compositions are preferably substantially identical in identified materials but may have different quantities of those materials as expressed in weight percent.

Cemented metal carbide having similar binder compositions is preferably sorted into lots according to grain size. A fine grain size lot has a grain size less than about 2 microns, a medium grain size lot has a grain size from about 2 to less than about 5 microns, and a coarse grain size has a grain size greater than about 5 microns, and a coarse grain size has a grain size greater than about 5 microns. Preferably the cemented carbide is additionally separated according to metal carbide composition. Typically the metal carbide separation is based on the amount of alloying metal carbides present with tungsten carbide. Typical alloying metal carbides are titanium carbide, tantalum carbide, and niobium carbide. In a straight grade, the metal carbide consist essentially of tungsten carbide with less than about $\frac{1}{2}$ percent of the alloying metal carbides. In low alloy grade, from about $\frac{1}{2}$ to less than about 4 percent of the metal carbide is an alloying metal carbide with the remainder tungsten carbide. Medium alloy grade tungsten carbide consists of from about 4 to about 8 percent alloying metal carbide and high alloy grade consists of more than about 8 percent by weight alloying metal carbide.

It has been found even more preferable to separate typical cemented metal carbide scrap having cobalt as a binder metal into the following nine grades based on grain size and alloying metal carbide. The first grade is straight grade and fine grain. Second grade is straight grade and medium grain. Third grade is straight grade and coarse grain. Fourth, fifth and sixth grades are low alloy with lots of fine, medium and coarse grain. The medium and high alloy grades may be similarly separated but due to the predominate use of the higher alloys for fine grain materials, it is usually sufficient to provide an additional separation of fine grain medium alloy and fine grain high alloy.

Metal carbide in powder form is recovered from pieces of metal carbide having substantially similar metal binder composition by determining the grain size of at least some of the pieces and separating the pieces having a determined grain size corresponding to the desired grain size into a separate lot. The grain size is ascertained as a function of coercive force and metal binder content. The resulting lot is then treated to recover the metal carbide. The preferable methods of treating are either with hydrochloric acid or molten zinc as hereinafter described.

The sorted lots are treated to form a powder containing metal carbide. It has been found that reprocessing the reclaimed metal carbide grains by sintering into a cemented carbide body results in properties similar to the original virgin material cemented carbides.

According to the preferred process, the cemented metal carbide is treated with hydrochloric acid to dissolve the metal binder. In general, the geometrical size of the cemented refractory metal carbide pieces utilized is not critical when treating with hydrochloric acid. The length of time needed to remove the matrix material is related to the size of the cemented carbide. The larger the size, the longer the digestion is required. With particular sizes less than 0.25 inches in any dimension, the cobalt content can be reduced to below about 0.5 percent within about eight hours. In the case where the matrix binder material is cobalt, it has been found that only 2 moles of hydrochloric acid are consumed per mole of cobalt. As hereinbefore stated, it is preferable to use an excess amount of hydrochloric acid and a sufficient amount so as to totally immerse the scrap material in the aqueous hydrochloric acid solution. It is preferable that the digestion process be carried out for a sufficient period of time to reduce the matrix content of the carbide to less than about 0.3 percent, more preferably to less than 0.2 percent, and even more preferably less than 0.05 percent.

It has been found that with the use of the azeotropic hydrochloric acid solution, the matrix materials are dissolved into the solution leaving a residue of metal carbide material comprising matrix depleted pieces of metal carbide. It has been found that the aqueous solution containing dissolved metal values such as cobalt, iron and nickel may be processed to recover the valuable materials therefrom. The resulting matrix depleted metal carbide product has a constituency based on the constituency of the metal carbide in the starting scrap.

According to another preferred process of treating cemented metal carbide to recover metal carbide powder. The cemented metal carbide scrap is treated with molten zinc for a sufficient period of time and at a sufficient temperature to form a resulting alloy containing zinc and separating the zinc from the alloy. The treatment with molten zinc results in the formation of a molten alloy with the metal binder or matrix material and frees the tungsten carbide. The molten alloy of zinc and metal binder may be distilled to remove the zinc and leave a friable product comprising metal binder and tungsten carbide. The zinc vapors are recovered by condensation and may be subseuently reused for treating additional cemented metal carbide. The apparatus employed is described in U.S. Pat. No. 3,595,484 to Barnard.

The recovered metal carbide powder may be processed to form a refractory body. In the case where hydrochloric is used, the resulting metal carbide is depleted of metal binder so that metal binder material must be added. In the case where zinc is used, the resulting metal carbide includes metal binder so that additions of metal binder will increase the metal binder content to a level above the scrap. The blended mixture of reclaimed metal carbide together with metal binder and an organic binder such as a wax is particularily suited for forming working surfaces of tools or other wear resistant articles by compressing and sintering. Pressing is generally performed in molds at pressures ranging from 5 to 30 tons per square inch depending on size and shape of the compact. Sintering is performed at temperatures from about 1400° C. to 1500 degrees centigrade at times of from about 30 to 40 minutes.

EXAMPLE

The following are five types of metal carbide powder which are typical of those used to make cemented metal carbides which are recovered from typical scrap.

| Item | Composition | Application |
|------|-------------|-------------|
| A | SC20 + 6Co | Standard Cutting Tool |
| B | SC40 + 10Co | Coal Mining |
| C | SC63 + 10Co | Rock Drilling |
| D | SC60 + 25Co + 5TaC | Die |
| E | WC + 11.5TaC + 8.5 TiC + 8.5Co | Steel Cutting |

These metal powder grades form cemented carbides of different grain size and composition which are typically used for purposes set forth above.

A scrap mixture of the above cemented carbides, lots A–E, was separated into lots according to their composition by using an EGG Ortec (Tefa III) X-ray fluorescence machine. The compositional analysis of the samples in respective lots is as follows: 1. A sample—94% tungsten carbide, 6% cobalt binder; 2. B and C sample—90% tungsten carbide, 10% cobalt; 3. D sample—60% tungsten carbide, 5.4% tantalum carbide, 25% cobalt; 4. E sample—72% tungsten carbide, 8.5% cobalt, 11.6% tantalum carbide. The coercive force of cemented carbide pieces was next measured on a Forester coercive force instrument. Lot 2 which contained B and C samples was separated into two lots based on coercive force measurement. Average coercive force for lot B was 130 and for C force was 85. The final categorization of the lots was as follows:

| Lot | Cobalt | TaC | C.F. | Designation |
|-----|--------|-----|------|-------------|
| A | 6 | 0 | 210 | Straight grade-fine |
| B | 10 | 0 | 130 | Straight grade-medium |
| C | 10 | 0 | 85 | Straight grade-coarse |
| D | 25 | 6.4 | 55 | Medium alloy grade |
| E | 8.5 | 11.6 | 130 | High alloy grade |

Forty 40 kilograms of each of these scrap lots were each separately acid leached with hydrochloric acid. Each lot was leached with an azeotropic hydrochloric acid solution. Full leaching was easily attained with the one-quarter inch thick scrap pieces.

Each of the reclaim scrap lots was jaw crushed and roller crushed to −12 mesh. The crushed scrap was milled for 8 hours at 100 rpm in 5"×7"ball mills. For 2½kilograms of crushed scrap, 8 kilograms of carbide balls were used. The final powder was screened to −200 mesh. Grade powders were made in a 4 inch attritor mill by adding virgin cobalt, 2% wax, and the carbide powder and milling for 1 hour at 150 rpm. Two hundred (200) grams of mixture was milled in hexane with 2000 gms of tungsten carbide balls. Each lot was spray dried to produce reclaim lots of grade powder.

Table I lists all the properties obtained from the reclaimed cemented carbides (RC) as compared to the starting scrap cemented carbides (SC) for respective lots. The density coercive force, magnetic saturation, hardness and the porosity are very close for the reclaimed (RC) and respective starting scrap (SC) lots. This is true even though the starting Fisher number of virgin and reclaim powders were very different. Shrinkage is slightly higher for the reclaim powders. Even though the reclaim powders are milled prior to sintering, the grain size is as if the metal carbide powder used to prepare the starting scrap (SC) was used to prepare the reclaimed cemented carbide (RC). Carbon and weight loss at both 110° C. and 450° C. in hydrogen compares very well. There is a nitrogen pick up for all reclaim WC. The oxygen pick up is substantial for lots containing TaC. Photomicrographs of samples from the lots A–E were compared with respective photomicrographs of cemented carbides made from powders reclaimed from the respective lots A–E. The grain sizes of the respective original and reclaim cemented carbide were almost identical.

TABLE I

| | Properties of the Reclaimed Cemented Carbides Compared to Starting Scrap Cemented Carbide | | | | |
|---|---|---|---|---|---|
| | A | B | C | D | E** |
| SC - Density | 14.89 | 14.60 | 14.49 | 12.99 | 12.55 |
| RC - Density | 15.01 | 14.51 | 14.51 | 13.06 | 12.63 |

TABLE I-continued
Properties of the Reclaimed Cemented Carbides Compared to Starting Scrap Cemented Carbide

|  | A | B | C | D | E** |
|---|---|---|---|---|---|
| SC - Coercive Force | 210 | 132 | 82 | 57 | 130 |
| RC - Coercive Force | 191 | 122 | 94 | 59 | 124 |
| SC - Mag. Sat. | 9.38 | 13.64 | 14.66 | 37.34 | 13.5 |
| RC - Mag. Sat. | 8.01 | 14.75 | 14.24 | 36.00 | 14.75 |
| SC - % Shrinkage | 16.9 | 16.2 | 15.3 | 15.5 | 17.2 |
| RC - % Shrinkage | 17.0 | 17.0 | 17.0 | 17.7 | 17.0 |
| SC - Hardness $R_A$ | 92.1 | 90.3 | 88.3 | 83.5 | 91.3 |
| RC - Hardness $R_A$ | 91.5 | 89.8 | 88.8 | 83.8 | 90.2 |
| SC - Porosity 200X* | $<A_1<B_1$ | $<A_1<B_1$ | $VLA_1<B_1$ | $VLA_1<B_1$ | $A_2B_1$ |
| RC - Porosity 200X* | $<A_1<B_1$ | $<A_1<B_1$ | $<A_1<B_1$ | $VLA_1VLB_1$ | $<A_1<B_1$ |
| SC - CT | 5.85 | 5.56 | 5.5 | 4.57 | 6.74 |
| RC - CT | 5.74 | 5.57 | 5.55 | 4.59 | 6.23 |
| SC - Wt Loss 110° C. | .04 | .05 | .03 | .16 | .15 |
| RC - Wt Loss 110° C. | .07 | .06 | .02 | .11 | .11 |
| SC - Wt Loss 450° C. | 2.36 | 2.63 | 1.90 | 2.27 | 2.40 |
| RC - Wt Loss 450°° C. | 2.16 | 2.02 | 2.08 | 2.15 | 2.11 |
| SC - Oxygen ppm | 1400 | 1700 | 1000 | 1900 | 3000 |
| RC - Oxygen ppm | 2000 | 1300 | 1300 | 2300 | 3700 |
| SC - Nitrogen ppm | 45 | 15 | 13 | 20 | 500 |
| RC - Nitrogen ppm | 75 | 40 | 30 | 30 | 650 |

*$<A_1$ = Less than $A_1$ type porosity. $VLA_1$ = Very less than $A_1$ type porosity.
**Typical numbers are quoted for virgin E wherever possible as the original scrap lot was not evaluated by use test.
SC = Scrap Cemented Carbide From Respective Lot
RC = Reclaimed Cemented Carbide Prepared From Respective Lot.

About 40 kilogram portions of each of the scrap lots described above are treated with zinc according to the process described in Example I of U.S. Pat. 3,595,484 to Barnard et al to dissolve the metal binder. The disclosure of Barnard et al is incorporated by reference into this example. For each of the above mentioned lots, the resulting powder was pressed to cemented carbide in a manner described above with similar results which confirm the similarity between the virgin metal carbide and reclaim metal carbide.

INDUSTRIAL APPLICABILITY

The present invention is useful for reclaiming metal carbide powder from scrap material which can be re-processed to cemented metal carbides having predetermined desirable properties.

We claim:

1. A method of reclaiming metal carbide in powder form from pieces of cemented metal carbide according to a desired grain size wherein said pieces have a substantially similar metal binder composition comprising determining the grain size of said pieces by measuring the coercive force of at least some of said pieces and ascertaining the grain size of said same pieces as a function of measured coercive force and metal binder content according to an approximate straight line when plotted on a Cartesian graph with the log G as the ordinate and Hc is the absicisa, where G is grain size and Hc is coercive force in oersteds according to the following equation:

$$\log G = I_1 - mHc$$

m = slope of said straight line
$I_1$ = intercept of straight line with ordinate
separating said pieces having an ascertained grain size into a lot, treating said lot with molten zinc for a time and at a temperature to form an alloy of zinc and said matrix metal binder, and subsequently removing said alloy to form a friable powder comprising metal carbide and metal binder.

* * * * *